Nov. 10, 1942.   R. F. HLAVATY   2,301,657
INSULATING CONTAINER
Filed June 10, 1938    2 Sheets-Sheet 1
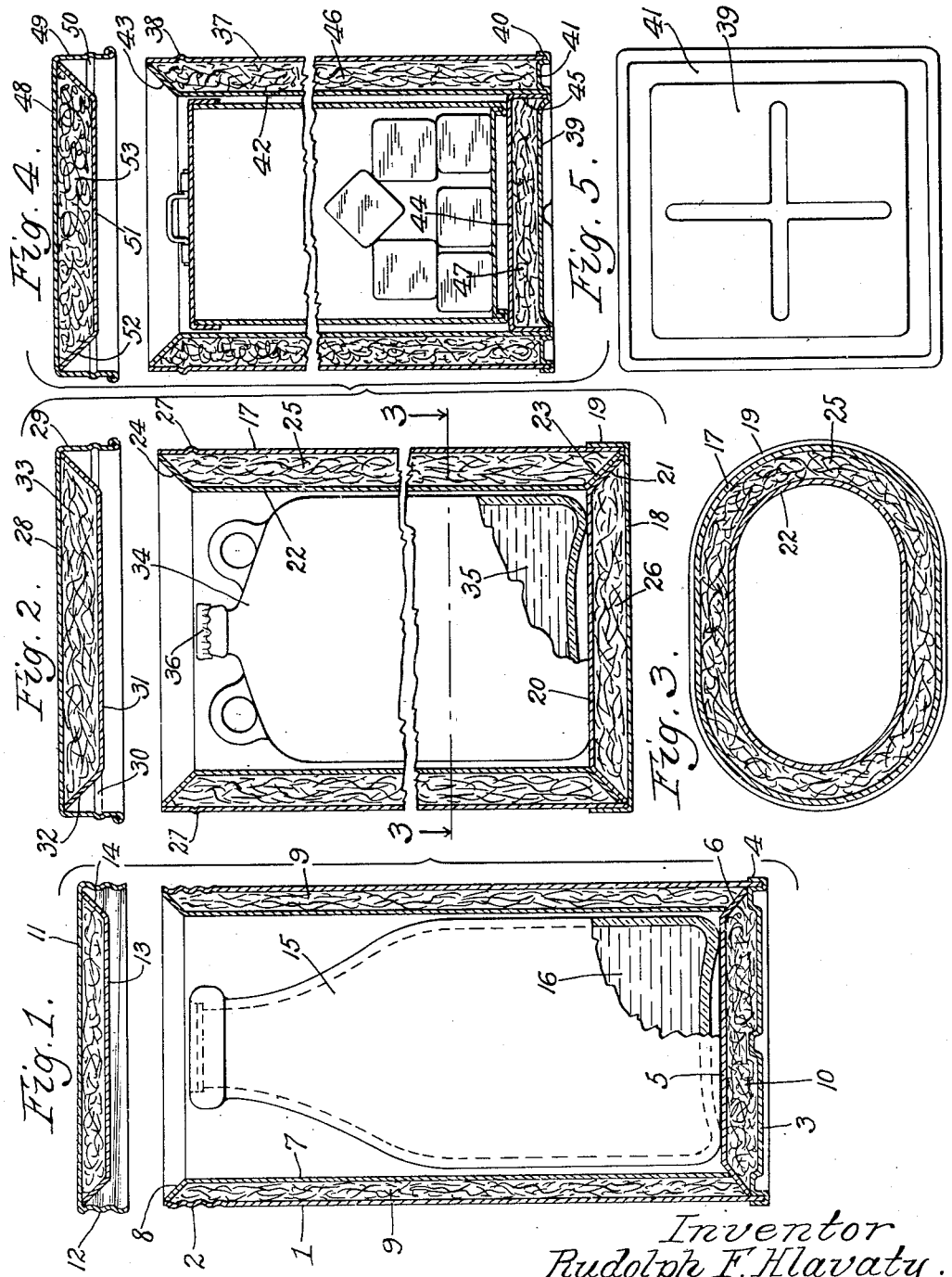
Inventor
Rudolph F. Hlavaty.
by Parker + Carter.
Attorneys.

Nov. 10, 1942.    R. F. HLAVATY    2,301,657
INSULATING CONTAINER
Filed June 10, 1938    2 Sheets-Sheet 2
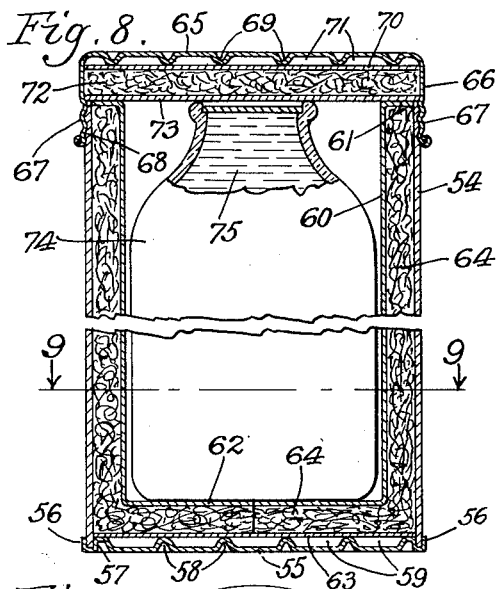
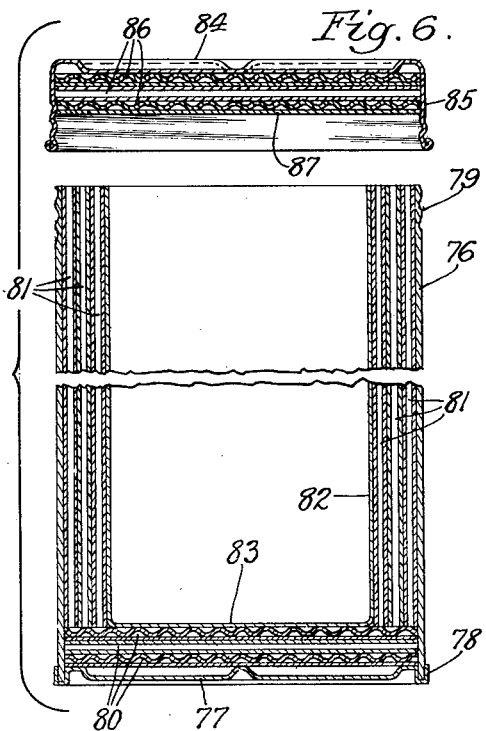
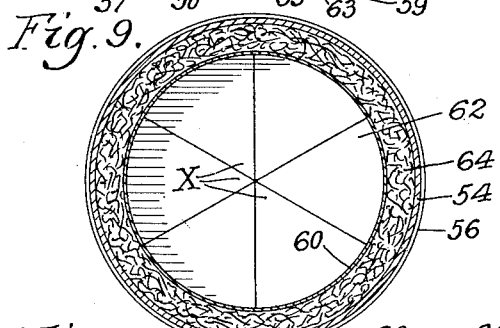
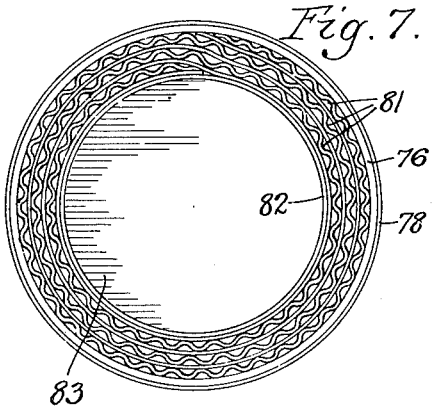
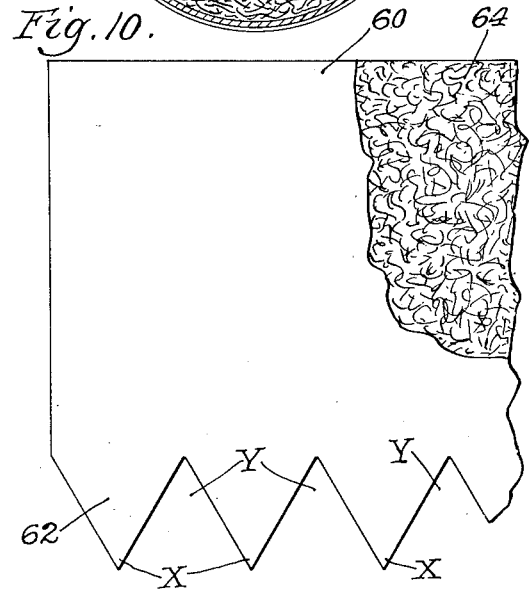
Inventor
Rudolph F. Hlavaty
by Parker + Carter.
Attorneys.

Patented Nov. 10, 1942

2,301,657

UNITED STATES PATENT OFFICE 2,301,657

INSULATING CONTAINER

Rudolph F. Hlavaty, Cicero, Ill.

Application June 10, 1938, Serial No. 212,903

4 Claims. (Cl. 220—9)

This invention relates to an insulated container and has for one object to provide a container which is heat insulating and which is inexpensive, and which may be used primarily as an insulating means adapted to receive a liquid or solid container for foods, such as butter, meats and the like, or for commercial materials or products such as drugs, chemicals, cements, and any other material, liquid, solid or plastic, which it is desired to keep at an even temperature.

One object is thus to provide an insulating container in which a bottle or jar or analogous member may be removably positioned so as to maintain the temperature of the bottle and its contents. It may of course be used to keep the contents cool, if it is initially cool, or to keep it warm, if it is initially warm or hot.

Another object is to provide a method of making such a container in which the bottles, jars, cans, packages, or other containers may be removably positioned to be maintained at an even temperature.

Other objects will appear from time to time in the course of the specification and claims.

The invention is illustrated more or less diagrammatically in the accompanying drawings, wherein:

Figure 1 is a vertical cross section through one form of the device having a bottle positioned therewithin, the bottle being shown partly in section and partly in elevation;

Figure 2 is a sectional view similar to Figure 1 showing a modified form;

Figure 3 is a transverse cross section taken at line 3—3 of Figure 2;

Figure 4 is a sectional view similar to Figures 1 and 2 showing a further modified form;

Figure 5 is a bottom view of the device of Figure 4;

Figure 6 is a sectional view illustrating a further modified form in which corrugated paper is used;

Figure 7 is a plan view of the device of Figure 6 with the cover removed.

Figure 8 is a still further modification;

Figure 9 is a transverse sectional view taken at line 9—9 of Figure 8; and

Figure 10 is a plan view with parts broken away illustrating a portion of the liner of the device of Figures 8 and 9 before association with the outer container.

Like parts are indicated by like symbols throughout the specification and drawings.

In the form shown in Figure 1, I is an outer container which may be threaded as at 2. 3 is a bottom which may be formed of metal or other material if desired, and is provided with an annular peripheral flange 4 to engage the lower edge of the member I. 5 is a cup-shaped bottom member which preferably has an outwardly inclined edge 6 resting upon the bottom 3 and projecting to contact the inner face of the member I. 7 is a liner of lesser diameter than the member I and provided adjacent its top with an outwardly flaring inclined portion 8 which preferably contacts at its outer edge the interior face of the member I adjacent the upper edge of the threading 2. An insulating filling 9, which may be of kapok or other desirable insulation, is positioned between the outer member I and the liner 7. Similarly, as at 10, the bottom is provided with insulation which is positioned between the bottom wall 3 and the cup-shaped member 5.

A top 11, which may be of metal or other suitable material, is preferably provided with a downwardly depending threaded flange 12 shaped to engage the threading 2 of the member I. It may be provided with an internal wall member 13 which is provided with an inclined peripheral flange 14, which terminates at or adjacent the inner face of the flange 12. The angle upon which the peripheral flange 14 is inclined preferably corresponds to that upon which the member 8 is inclined, so that when the lid is in position on the container, the two are in contact with each other and form a seal or at least a close contact through which temperature losses are difficult, if not impossible.

While many sorts of liquid or other containers may be positioned removably within the device of Figure 1, there is shown a bottle 15 which may contain liquid or other material 16 and is held within the device as a whole. Preferably it corresponds approximately in width and length to the internal dimension of the insulating container so that it does not rattle or shift about.

In the form of Figures 2 and 3, the device is substantially the same as that shown in Figure 1 except that it is oval in shape. Thus, as shown, there is an outer housing or wall 17, a bottom 18 having a peripheral flange 19, an inner bottom member 20 having an inclined peripheral member 21, and there is also provided a liner 22 having at its lower end an inclined flange 23 which lies preferably flush against the inclined flange 21 of the bottom member 20. At its upper end the member 22 is preferably provided with a corresponding inclined flange 24 which, at its outer edge, contacts the housing or casing member 17. Insulating material of kapok or other desired nature may be provided in the walls as at 25 and in the bottom as at 26. The wall may be provided on its exterior with a bead 27 or with other projections, for a purpose described above.

The cap member 28 is provided for use in connection with the device and, as shown, corresponds in shape to the latter. It is provided with a peripheral flange 29 which may have a groove 30 on its interior, which, when the cap is in position on the container, engages the bead 27 to prevent accidental removal of the cap. The cap is provided with an internal liner member 31 having a peripherally inclined portion 32 which contacts the inner surface of the flange 29, and which is preferably of the same inclination as the portion 24 of the liner 22 so that the two are in close or sealing contact when the lid is in position. Insulation 33 is positioned between the exterior cap member 28 and the liner 31.

A container 34 may be positioned within the housing and, as shown, it may contain liquid 35 or any other suitable material which it is desired to preserve. It may have a cap 36 to close its opening or may be of any desired shape.

As shown, Figure 4 contains a square metallic container, but obviously the container need not be square, and a rectangular or rounded container may equally well be inserted. The square container is shown merely to indicate the fact that as an economy of space, ordinarily the container within the outer insulated housing will correspond in shape to it. In general it comprises an outer wall member 37 having an external bead 38. The wall member is engaged by a bottom 39 which has an upwardly extending peripheral flange 40. An annular raised portion 41 in the bottom serves also to position a liner member 42 which at its upper end is provided with an inclined peripheral portion 43. A bottom liner 44 is provided with a downwardly depending peripheral flange 45 which engages or abuts against the liner 42 and is positioned with it by the shape of the bottom member 39. Insulating material 46 is positioned between the wall 37 and the liner 42, and correspondingly insulation 47 is positioned between the bottom 39 and the bottom liner 44.

A square or rectangular top 48 is provided with a downwardly depending flange 49 and a groove or depression 50 which engages the bead 38 when the parts are closed. An internal liner 51 is provided for the cap and is itself provided with an inclined peripheral flange 52 which contacts or approaches the inner surface of the depending member 49. It preferably has the same inclination as the member 43. Between the cap 48 and the liner 51 is positioned insulation 53 of any desired nature.

As shown in Figures 6 and 7, the device uses corrugated paper or the like to effect the insulation, and as there shown, the device comprises an outer wall 76 and a bottom 77, which is provided with an upwardly extending flange 78 to engage the bottom edge of the member 76. At its top, the member 76 is threaded as at 79. Positioned upon the bottom 77 are a plurality of discs 80 formed of corrugated paper as shown. These discs are preferably so arranged that the corrugations in one layer or lamination do not run in the same direction as those in the adjacent layer or lamination. The side walls of the insulation are formed of a plurality of layers of corrugated paper 81. These may be continuous, formed of a single strip or sheet as shown particularly in Figure 7, or may be made of several separate portions. As shown, preferably several laminations or thicknesses of the corrugated paper are provided. A liner 82 within the corrugated paper may be provided if desired, although it is not always essential. As shown, the liner 82 has an integral bottom 83. The bottom might be omitted or might be made separately.

The cap for the device of Figures 6 and 7 comprises a member 84 with a downwardly depending threaded flange 85, which engages the threading 79 on the member 76. The top is insulated by a plurality of discs 86 which are formed of corrugated paper and are preferably arranged so that the corrugations of contiguous laminations run in opposite directions. Similar to the body of the device of Figure 6, the cap may have a closing or lining sheet 87, if desired, or this may be omitted.

As shown in Figure 8, the device may be similar to that shown in Figure 1 except for a difference in assembling the insulation. In the form of Figure 8, therefore, the device comprises an outer wall member 54 and a bottom 55 which has a peripheral upwardly extending flange 56 and that may be shaped as at 57 to provide a relatively limited annular groove within which the bottom edge of the wall member 54 is engaged. The bottom is elsewhere provided with raised portions 58 of any desired shape or arrangement which provide air spaces 59 as will be described presently.

A liner 60 is provided within the wall member 54 and may have a flat outwardly extending flange 61 which engages or abuts against the wall member 54. At its bottom the liner member 60 is provided with an integral liner portion 62 which with it forms a complete liner or enclosure for the interior of the container. A bottom plate-like member 63 may be provided within the container and resting upon the bottom 55 and particularly upon the projection 58 so that the air spaces 59 are provided between the bottom 55 and the plate 63.

Between the wall 54 and the liner 60, 62, a body of insulation 64 is provided.

As shown in Figure 10, the liner 60, 62 may be formed as a sheet which comprises a body of insulating material 64 and a sheet which may be pasted to it or may be of material such as paint, shellac or the like which is painted or projected upon the sheet of insulating material and forms a unit with it. When a liner is to be cut from material of this sort, it is preferably provided with a sawtooth formation along one edge and thus material is economized because there is no wastage. A sheet of predetermined size is cut down the middle with a sawtooth formation producing the teeth X interrupted by the depressions Y, and the teeth X of one liner member project into the interruptions or depressions Y of the other. These teeth X are folded inwardly as shown in Figures 8 and 9 to form the bottom of the liner which is thus integral with the side walls.

In the device of Figure 8, a top is formed of a member 65 having a downwardly depending flange 66, which may be threaded as at 67 to engage corresponding threading 68 on the outer face of the wall member 54. The top may be provided with depressions 69 of any desired form against which is positioned a plate 70 so that air spaces or pockets 71 are formed between the inner surface of the top 65 and plate 70. Insulation, which may be cut from a sheet such as that shown in Figure 10, is provided within the top, and as shown includes a body of insulating material 72 and an outer plate or surface member 73 which may be integral with it or separate from it. A container 74 is positioned within the housing and contains liquid or other material 75.

It will be realized that whereas I have herewith shown and described a practical operative device, nevertheless many changes might be made in the size, shape, number and disposition of parts without departing from the spirit of the invention and I wish, therefore, that my showing be taken as in a sense diagrammatic. In particular, the details of construction may be varied and the details of the material may be varied, and the type of container, whether it be bottle, jar, can, wrapping or the like may be almost infinitely varied without departing from the spirit of the invention.

I claim:

1. In combination in an insulating container, an outer wall, an inner wall spaced inwardly therefrom, the inner wall carrying at its upper end an outwardly bent, inclined flange which contacts said outer wall at substantially its top, a bottom member shaped with a peripheral annular groove, the bottom edge of the outer wall being secured therein, an inner bottom wall formed of a plate-like member and provided with a peripheral downwardly extending inclined flange, said flange extending toward said outer wall and contacting, at its edge, said bottom member, the bottom edge of the inner side wall contacting the bottom inner wall member at a point spaced away from the said groove and being spaced against lateral inward displacement by said contact.

2. In combination in an insulating container, an outer wall, an inner wall spaced inwardly therefrom, fibrous insulation positioned therebetween the inner wall carrying at its upper end an outwardly bent, upwardly inclined flange which contacts said outer wall, a bottom member, the bottom edge of the outer wall being secured therein, an inner bottom wall formed of a plate-like member and provided with an integral peripheral downwardly extending inclined flange, said flange sloping downward and extending to said outer wall and said bottom member, the bottom edge of the inner side wall contacting the sloping portion of the bottom inner wall member and being spaced against lateral displacement thereby.

3. In combination in an insulating container, an outer wall, an inner wall spaced inwardly therefrom, and fibrous insulation spaced between and filling the space between said walls, the inner wall carrying at its upper end an outwardly bent, upwardly inclined flange which contacts said outer wall, a bottom member, the bottom edge of the outer wall being embraced thereby and secured therein, an inner bottom wall formed of a generally concave plate-like member and provided with a peripheral downwardly extending inclined flange, said flange extending to said outer wall and to said bottom member, the bottom edge of the inner side wall contacting the bottom inner wall member at a point below its upper surface and being spaced against lateral displacement thereby.

4. In combination in an insulating container, an outer wall, an inner wall spaced inwardly therefrom, insulation filling the space therebetween, the inner wall carrying at its upper end an outwardly bent integral flange which contacts said outer wall, a bottom member shaped with a peripheral annular groove, the bottom edge of the outer wall being secured therein, an inner bottom wall formed of a plate-like member and provided with a peripheral downwardly extending flange, said flange extending to said outer wall and to said bottom member, the bottom edge of the inner side wall contacting the bottom inner wall member at a point below its upper surface and being spaced against lateral inward displacement thereby.

RUDOLPH F. HLAVATY.